(12) United States Patent
Hua et al.

(10) Patent No.: US 12,388,337 B2
(45) Date of Patent: Aug. 12, 2025

(54) METHOD AND SYSTEM FOR MEASURING FLUX-SWITCHING ELECTRIC MOTOR ROTOR ANGLE ON BASIS OF LINEAR HALL SENSORS

(71) Applicant: SOUTHEAST UNIVERSITY, Jiangsu (CN)

(72) Inventors: Wei Hua, Jiangsu (CN); Yuchen Wang, Jiangsu (CN); Kai Liu, Jiangsu (CN); Chao Zhang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 113 days.

(21) Appl. No.: 18/279,391

(22) PCT Filed: Nov. 29, 2021

(86) PCT No.: PCT/CN2021/133959
§ 371 (c)(1),
(2) Date: Aug. 30, 2023

(87) PCT Pub. No.: WO2022/222475
PCT Pub. Date: Oct. 27, 2022

(65) Prior Publication Data
US 2024/0204638 A1    Jun. 20, 2024

(30) Foreign Application Priority Data
Apr. 22, 2021  (CN) .......................... 202110435893.2

(51) Int. Cl.
*H02K 11/215* (2016.01)
*H02K 29/08* (2006.01)
*H02P 21/18* (2016.01)

(52) U.S. Cl.
CPC ........... *H02K 29/08* (2013.01); *H02K 11/215* (2016.01); *H02P 21/18* (2016.02)

(58) Field of Classification Search
CPC ........ H02K 29/08; H02K 11/215; H02P 21/18
See application file for complete search history.

(56) References Cited

U.S. PATENT DOCUMENTS

| | | | |
|---|---|---|---|
| 10,591,893 B2 * | 3/2020 | Furukawa | H02K 11/33 |
| 2002/0143288 A1 | 10/2002 | Larsen et al. | |
| 2009/0284201 A1 * | 11/2009 | Jeung | H02K 11/215 |
| | | | 318/400.11 |

FOREIGN PATENT DOCUMENTS

| | | |
|---|---|---|
| CN | 103222167 | 1/2016 |
| CN | 206743048 | 12/2017 |

(Continued)

OTHER PUBLICATIONS

"International Search Report (Form PCT/ISA/210) of PCT/CN2021/133959," mailed on Jan. 24, 2022, with English translation thereof, pp. 1-4.

(Continued)

*Primary Examiner* — Cortez M Cook
(74) *Attorney, Agent, or Firm* — JCIPRNET

(57) ABSTRACT

Disclosed are a method and system for measuring a flux-switching electric motor rotor angle on the basis of linear Hall. The method comprises: firstly, selecting four linear Hall sensors and respectively mounting same in four slots of a stator; a first linear Hall sensor is mounted in any slot of the stator, and a second linear Hall sensor is spaced apart from the first linear Hall sensor by $N_1$ slots in a unified direction; $N_1$ is an even number, and $N_1 \neq ks/(2p)$; a third linear Hall sensor is spaced apart from the first linear Hall sensor by $N_2$ slots; $N_2$ is an odd number, and $N_2=(2k-1)s/(2p)$; and a fourth linear Hall sensor is spaced apart from the second linear Hall sensor by $N_2$ slots; and then calculating an electric motor rotor angle according to voltage signals of the four linear Hall sensors.

6 Claims, 5 Drawing Sheets

(56) References Cited

FOREIGN PATENT DOCUMENTS

| CN | 108063523 | 5/2018 |
|---|---|---|
| CN | 105811828 | 8/2018 |
| CN | 108496300 | 9/2018 |
| CN | 111740672 | 10/2020 |
| CN | 112152412 | 12/2020 |
| CN | 113258741 | 8/2021 |

OTHER PUBLICATIONS

"Written Opinion of the International Searching Authority (Form PCT/ISA/237) of PCT/CN2021/133959," mailed on Jan. 24, 2022, pp. 1-5.

* cited by examiner

METHOD AND SYSTEM FOR MEASURING FLUX-SWITCHING ELECTRIC MOTOR ROTOR ANGLE ON BASIS OF LINEAR HALL SENSORS

CROSS-REFERENCE TO RELATED APPLICATION

This application is a 371 of international application of PCT application serial no. PCT/CN2021/133959, filed on Nov. 29, 2021, which claims the priority benefit of China application no. 202110435893.2, filed on Apr. 22, 2021. The entirety of each of the above mentioned patent applications is hereby incorporated by reference herein and made a part of this specification.

TECHNICAL FIELD

The present invention relates to a technology for detecting the rotor angle of a magnetic flux-switching motor, particularly discloses a method and a system for measuring a flux-switching electric motor rotor angle on the basis of linear Hall sensors, and belongs to the technical field of power generation, power transformation or power distribution.

RELATED ART

When a traditional three-phase AC flux-switching motor is used for vector control, accurate rotor angle and rotational speed are required. A conventional rotor angle measurement method involves an external angle measurement apparatus coaxially connected with a rotating shaft. The external angle measurement apparatus is usually a photoelectric encoder, a rotary transformer or a magnetic encoder, which inevitably occupies the axial space and is easily affected by external environment such as electromagnetism, vibration, temperature, and humidity. Linear Hall sensors have the advantages of small size, high sensitivity, and the like, they are often mounted inside compact devices such as pan and tilt heads, and oil pump motors and the rotor position is estimated by detecting a leakage magnetic field of a permanent magnet inside a motor.

According to different installation positions of the linear Hall, position detection systems of the existing built-in linear Hall sensors can be divided into two types: a detection system placed at the end of a stator to detect an axial leakage magnetic field of a rotor; and a detection system placed on the stator teeth to detect a radial magnetic field of a rotor. The Chinese Patent with the Publication No. CN108063523A discloses a pan-tilt motor and its rotor position angle measurement method, and the Chinese Patent with the Publication No. CN108496300A discloses a motor position sensing method, both of which install a pair of linear Hall sensors directly below an axial direction of the permanent magnets to detect the leakage magnetic field. Even though the package of the linear Hall sensors is very small, placing them at the stator end still requires additional axial space in the motor. In a three-phase multi-state servo motor disclosed in a Chinese Patent with the Publication No. CN103222167B, a linear Hall sensor and another switching Hall sensor are both located on the circumferential surface of a stator punching sheet, and an electrical angle between the two Hall sensors is 90°; the Chinese Patent with the Publication No. CN05811828B discloses a linear Hall-based control method for rotary speed of a flywheel, where three-phase linear Hall sensors are symmetrically mounted at 120° on a stator of a brushless DC motor of a flywheel, so as to obtain a three-phase analog sinusoidal signal proportional to the strength of the flywheel air gap magnetic field. However, in order to ensure that the spatial distribution angle of the Hall sensors is 900 or 120°, stator teeth will inevitably be slotted, which will damage the original structure of the motor, change the main magnetic circuit distribution of the motor, and be susceptible to the impact of the armature reaction, such that the estimation accuracy of the rotor position is seriously reduced, and the performance of the motor is adversely affected.

Further, the detection objects involved in the existing position detection technology of the built-in linear Hall sensors are all traditional rotor permanent magnet synchronous motors, and there is no relevant research on the use of embedded magnetic encoders to detect the rotor position of magnetic flux-switching permanent magnet motors. At present, there are few researches on the initial position detection of a rotor of a stator permanent magnet brushless motor headed by the magnetic flux-switching permanent magnet motor. The existing detection methods mostly refer to the rotor position detection method of the permanent magnet synchronous motor, such as the high-frequency signal injection method. However, these methods used for reference have the disadvantages of complex inverter control, additional hardware circuits such as low-pass filters, and high-cost field programmable gate arrays. Therefore, it is urgent to provide a new solution applicable for the detection of a rotor angle of a permanent magnetic flux-switching motor.

SUMMARY OF INVENTION

In order to solve the defects in the above background art, the present invention aims to provide a method and a system for measuring a flux-switching electric motor rotor angle on the basis of linear Hall, specifically, a suitable mounting position and a mounting mode of magneto-sensitive sensors inside a stator permanent magnet type brushless motor are identified, the information of a rotor angle is obtained by processing the output signal of the magneto-sensitive sensors, so as to achieve the purpose of detecting the rotor angle of a magnetic flux-switching motor through built-in linear Hall sensors, and solve the technical problem that the built-in linear Hall sensor detection technology has not been used to detect the rotor angle of the magnetic flux-switching motor.

In order to achieve the above objective, the present invention provides the following technical solutions:

A method for measuring a flux-switching electric motor rotor angle on the basis of linear Hall sensors provided in the present invention includes the following steps: firstly, selecting four linear Hall sensors and respectively mounting them in four slots of a stator, and magnetically sensitive surfaces of the Hall sensors are all opposite the surface of a rotor salient pole; among the four linear Hall sensors, a first linear Hall sensor is mounted in any slot of the stator, a second linear Hall sensor, a third linear Hall sensor and a fourth linear Hall sensor are mounted in other slots of the stator in a clockwise or counterclockwise direction in sequence, the second linear Hall sensor is spaced apart from the first linear Hall sensor by $N_1$ slots, the third linear Hall sensor is spaced apart from the first linear Hall sensor by $N_2$ slots, the fourth linear Hall sensor is spaced apart from the second linear Hall sensor by $N_2$ slots, wherein $N_1$ is an even number, and $N_1 \neq ks/(2p)$, $N_2$ is an odd number, and $N_2=(2k-1)s/(2p)$, k being any integer, s being the number of slots of the stator, and p being the number of pairs of electric motor poles; then, calculating the angle corresponding to the position of the motor rotor according to the output voltage signals of the four linear Hall sensors.

Preferably, the method of calculating the rotor angle of the motor according to the output voltage signals of the four linear Hall sensors specifically includes the steps: converting the output voltage signals of the four linear Hall sensors into digital signals and then performing signal preprocessing to obtain digital signal values in a two-phase static coordinate system; and calculating a rotor angle value and a rotational speed value according to the digital signals in a two-phase stationary coordinate system.

Preferably, the digital signal converted from the output voltage signals of the four linear Hall sensors are preprocessed, including: superposition and linear combination of in-phase signals.

Preferably, the preprocessed output signals of the four linear Hall sensors meet the conditions that signals of the first linear Hall sensor and the third linear Hall sensor are in phase, and signals of the second linear Hall sensor and the fourth linear Hall sensor are in phase. For a set of in-phase signals, a set of in-phase signals suffer sag disturbances at the peaks or troughs, respectively. The two values at each moment are superimposed to obtain a pair of sinusoidal signals with a phase difference $\varphi_s$:

$$\begin{cases} U_A = U_1 + U_3 = U_m \cos\theta + \varepsilon(3\theta) \\ U_B = U_2 + U_4 = U_m \cos(\theta + \varphi_s) + \varepsilon(3\theta) \end{cases}.$$

Preferably, the model of the linear combination in the preprocessing is:

$$\begin{bmatrix} U_\alpha \\ U_\beta \end{bmatrix} = \begin{bmatrix} 1 & 0 \\ \dfrac{\cos\varphi_s}{\sin\varphi_s} & -\dfrac{1}{\sin\varphi_s} \end{bmatrix} \begin{bmatrix} U_A \\ U_B \end{bmatrix} = U_m \begin{bmatrix} \cos\theta \\ \sin\theta \end{bmatrix} + \begin{bmatrix} \varepsilon(3\theta) \\ \varepsilon(3\theta) \end{bmatrix},$$

wherein, $U_A$ and $U_B$ are a pair of sinusoidal signals (including the third harmonic $\varepsilon(3\theta)$) with an amplitude of $U_m$ and a phase difference of $\varphi_s$, $U_\alpha$ and $U_\beta$ are a pair of quadrature signals (including the third harmonic) in the two-phase stationary coordinate system; $U_\beta$ lags behind the signal $U_\alpha$ by an electrical angle of 90°, and $\theta$ is an actual electrical angle of the rotor.

A system for measuring a flux-switching electric motor rotor angle on the basis of linear Hall sensors provided in the present invention, including: a first linear Hall sensor, a second linear Hall sensor, a third linear Hall sensor, a fourth linear Hall sensor and a digital signal processor, the first, second, third and fourth linear Hall sensors are mounted in the slots of the stator according to the above mounting method, the digital signal processor is configured to receive output voltage signals from the first, second, third and fourth linear Hall sensors, and then output a rotor angle value and a rotational speed value calculated according to the output voltage signals of the first, second, third and fourth linear Hall sensors.

Preferably, the digital signal processor includes an analog-to-digital conversion module, an in-phase superposition module, a linear combination module, and phase-locked loops of synchronous reference system with the third harmonic suppression capability; the analog-to-digital conversion module is configured to convert the output voltage signals of the first, second, third and fourth linear Hall sensors into digital signals; the in-phase superposition module is configured to superimpose the output voltage signals of the first and third linear Hall sensors, and to superimpose the same of the second and fourth linear Hall sensors and to output a pair of sinusoidal signals with an amplitude of $U_m$ and a phase difference of $\varphi_s$ for linear combination, and to output a pair of quadrature signals $U_\alpha$ and $U_\beta$ the two-phase stationary coordinate system, and the phase-locked loops of synchronous reference system with the third harmonic suppression capability are configured to calculate the rotor angle value and the rotational speed value according to the quadrature signals in the two-phase stationary coordinate system after filtering out the third harmonic component.

Preferably, the phase-locked loops of synchronous reference system with the third harmonic suppression capability include: a notch filter, a phase detector, a loop filter and a voltage-controlled oscillator; and the notch filter is configured to filter out the specified third harmonic, leaving only the fundamental components of the quadrature signals in the two-phase stationary coordinate system.

An input end of the phase detector is connected to an output end of the notch filter module and an output end of the voltage-controlled oscillator, which is configured to perform 2s/2r transformation of the $U_\alpha$ and $U_\beta$ in the two-phase stationary coordinate system after being filtered out the third harmonic according to the rotor angle value $\hat{\theta}$ output by the voltage-controlled oscillator, and to output $U_d$ and $U_q$ in the two-phase stationary coordinate system; an input end of the loop filter is connected to an output terminal of the phase detector and is configured to make PI adjustment of the q-axis voltage $U_q$ in the two-phase stationary coordinate system, and then output the rotational speed value $\hat{\omega}$; and an input end of the voltage-controlled oscillator is connected to an output end of the loop filter, and is configured to output the rotor angle value $\hat{\theta}$ after integral processing of the output rotor speed value $\hat{\omega}$.

Compared with the prior art, the present invention has the following significant advantages:

(1) The present invention proposes a novel method for measuring flux-switching electric motor rotor angle. According to the method, two sets of magneto-sensitive sensors within in-phase output signals are mounted in the slots of the stator, and the two sets of in-phase signals output by the magneto-sensitive sensors are calculated. Such mounting method of magneto-sensitive sensors are applied in the flux-switching electric motor with any pole-slot matching form, a highly compact and low-cost measurement of rotor position of the stator brushless permanent magnet motor is achieved. Compared with the existing solution for measuring the rotor angle of the magnetic flux-switching electric motor, the present invention can realize efficient measurement without additional hardware circuits and high-cost components.

(2) The present invention performs in-phase signal superposition, linear combination, notch filtering, phase-locked loops of synchronous reference system of the output signals of the built-in linear Hall sensors to estimate the angle and speed of the rotor, and the digital calculation process only includes linear operations, 2s/2r transformation and closed-loop calculations, involving less computation and high efficiency for the digital signal processor.

(3) In the present invention, only four linear Hall sensors opposite the surfaces of the rotor salient poles are mounted in the slots of the stator, without occupying the axial space of the stator, and without slotting on the stator, which is conducive to the mounting of the Hall sensors and the installation of signal lines, realizing high-precision angle measurement, and meeting the requirements of angle measurement and speed measurement of high-performance magnetic flux switching motors.

Figure 1:
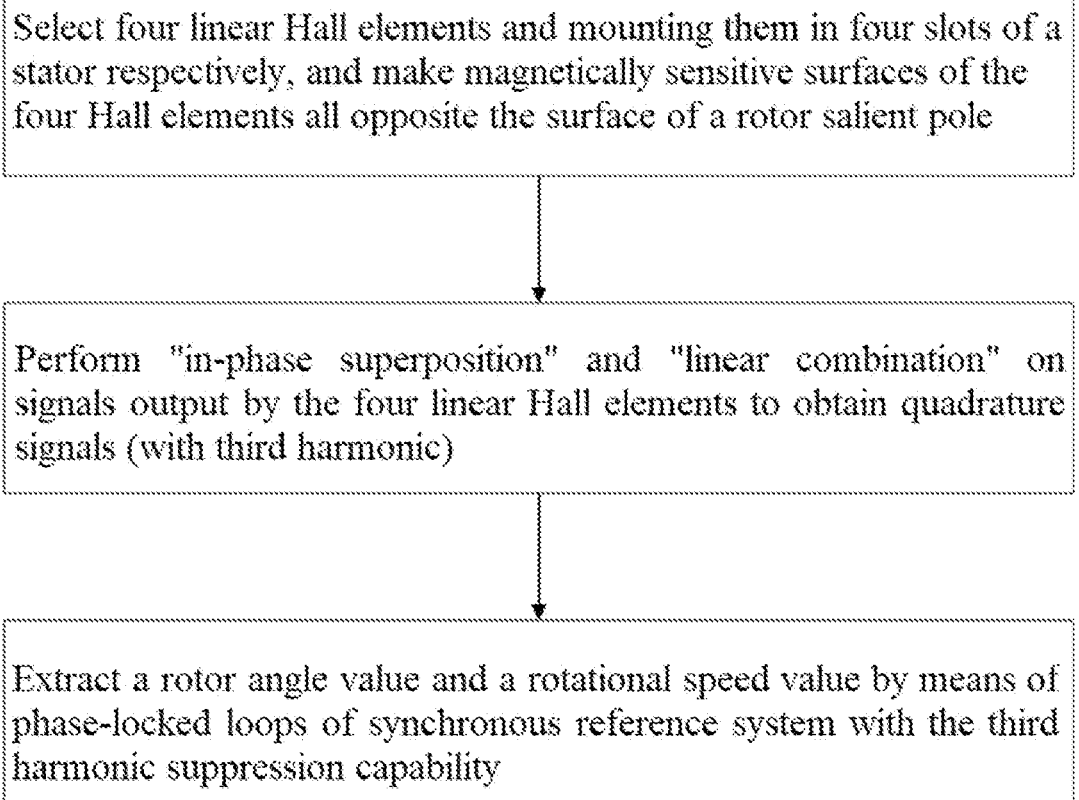
FIG. 1 is a flow chart of a method for measuring a flux-switching electric motor rotor angle on the basis of linear Hall sensors provided in the present invention.

Description of reference numerals in the drawings: 1. 12-slot and 10-pole magnetic flux-switching motor; 2. digital signal processor; 3. first linear Hall sensor; 4. second linear Hall sensor; 5. third linear Hall sensor; 6. fourth linear Hall sensor; 7. rotor; 8. stator; 9. rotating shaft; 10. permanent magnet; 11. slot; 12. notch filter; 13. phase detector; 14. loop filter; and 15. voltage-controlled oscillator.

DESCRIPTION OF EMBODIMENTS

The technical solution of the present invention will be further described below in conjunction with the accompanying drawings. A method for measuring a rotor angle of a magnetic flux-switching motor on the basis of linear Hall, as shown in FIG. 4, includes three steps as shown in FIG. 1.

Figure 4:
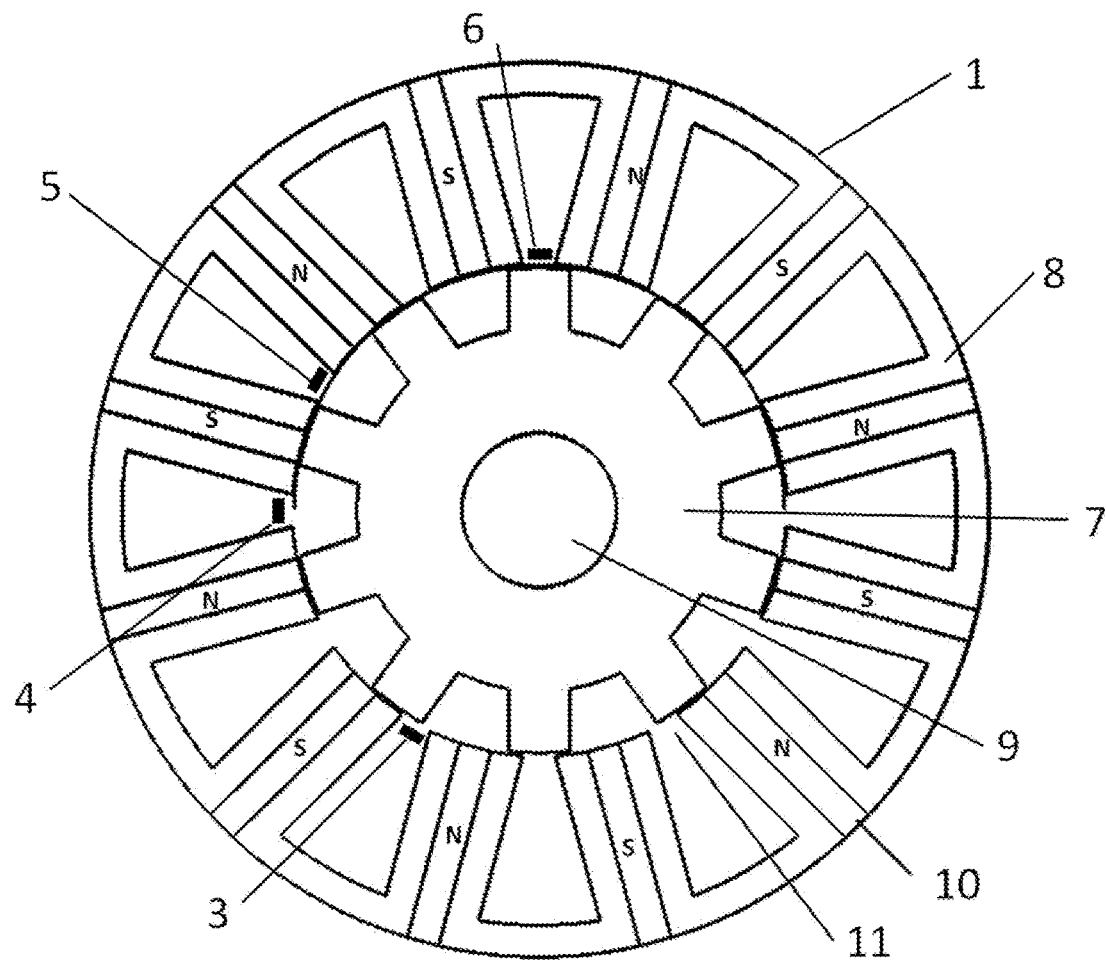
FIG. 4 is a structural schematic diagram of a flux-switching electric motor of the present invention.

Step A, selecting four linear Hall sensors and mounting them in four slots of a stator respectively, magnetically sensitive surfaces of the four linear Hall sensors are all opposite the surface of a rotor salient pole; as shown in FIG. 4, among the four linear Hall sensors, a first linear Hall sensor is mounted in any slot of the stator, and a second linear Hall sensor is spaced apart from the first linear Hall sensor by $N_1$ slots in a unified direction; $N_1$ is an even number, and $N_1 \neq ks/(2p)$, k being any integer, s being the number of slots of the stator, and p being the number of pairs of electric motor poles; a third linear Hall sensor is spaced apart from the first linear Hall sensor by $N_2$ slots; $N_2$ is an odd number, and $N_2 = (2k-1)s/(2p)$; and a fourth linear Hall sensor is spaced apart from the second linear Hall sensor by $N_2$ slots.

Step B, performing "in-phase superposition" and "linear combination" on voltage signals output by the four linear Hall sensors to obtain a quadrature signal, and the quadrature signal has third harmonic.

Step C, extracting a rotor angle value and a rotational speed value by means of phase-locked loops of synchronous reference system with the third harmonic suppression capability.

Figure 2:
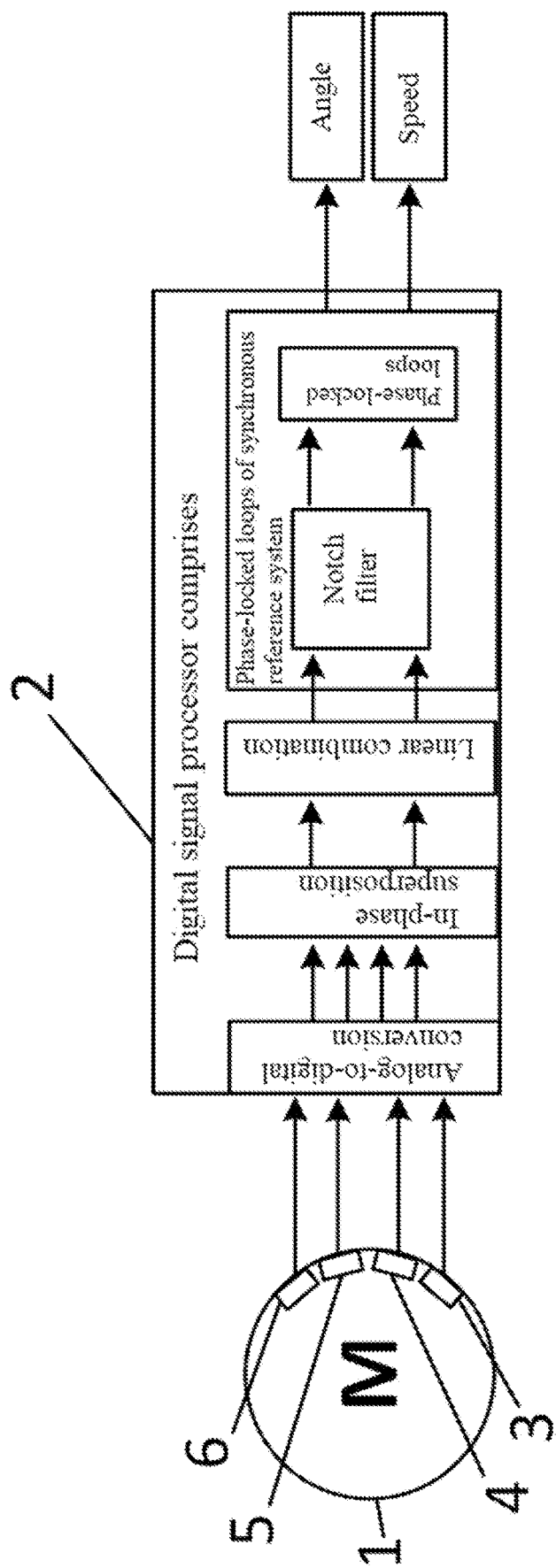
FIG. 2 is a module connection diagram of a system for measuring a flux-switching electric motor rotor angle on the basis of linear Hall sensors provided in the present invention.

As shown in FIG. 2, a digital signal processor 2 calculates the output voltage signals of the four linear Hall sensors obtain the rotor angle value and a rotor speed value. Firstly, the output voltage signals of the four linear Hall sensors are subject to analog-to-digital conversion to obtain digital signals, and then the digital signals are superimposed in phase and linearly combined to obtain a pair of quadrature signals in a two-phase stationary coordinate system. After being filtered out the third harmonic, the pair of quadrature signals in a two-phase stationary coordinate system is subject to a closed-loop control.

Assuming that the counterclockwise direction is a forward direction, when a rotor rotates at a constant speed, signals of the first linear Hall sensor and the third linear Hall sensor are in phase, and signals of the second linear Hall sensor and the fourth linear Hall sensor are in phase. An electrical angle phase difference of output voltage signals of the first linear Hall sensor and the second linear Hall sensor is $\varphi_s = (3600°*p/s)*N_1$, then:

$$\begin{cases} U_1 = U_m\cos\theta + U_{DC} + \delta_1 \\ U_2 = U_m\cos(\theta - \varphi_s) + U_{DC} + \delta_2 \\ U_3 = U_m\cos\theta - U_{DC} + \delta_3 \\ U_4 = U_m\cos(\theta - \varphi_s) - U_{DC} + \delta_4 \end{cases},$$

wherein, $U_1$ is a digital signal after analog-to-digital conversion of the output voltage signals of the first linear Hall sensor, $U_2$ is a digital signal after analog-to-digital conversion of the output voltage signals of the second linear Hall sensor, $U_3$ is a digital signal after analog-to-digital conversion of the output voltage signals of the third linear Hall sensor, and $U_4$ is a digital signal after analog-to-digital conversion of the output voltage signals of the fourth linear Hall sensor; $\delta_1$ is a disturbance term in the output voltage signals of the first linear Hall sensor, $\delta_2$ is a disturbance term in the output voltage signals of the second linear Hall sensor, $\delta_3$ is a disturbance term in the output voltage signals of the third linear Hall sensor, and $\delta_4$ is a disturbance term in the output voltage signals of the fourth linear Hall sensor; $U_m$ is amplitudes of the output voltage signals of the four linear Hall sensors, and the amplitudes are equal because the distance of the four linear Hall sensors is located on the same circumference; $U_{DC}$ is absolute values of the DC bias of the output voltage signals of the four linear Hall sensors, and the absolute values of the DC bias are equal because the four linear Hall sensors are located on the same circumference; and $\theta$ is an actual electrical angle of the rotor.

The method of calculating the rotor angle of the motor according to the output voltage signals of the four linear Hall sensors specifically includes the following steps:

Step 1: converting the output voltage signals of the four linear Hall sensors into digital signals and then performing signal preprocessing to obtain digital signal values in the two-phase static coordinate system.

Specifically, the model for preprocessing the digital signals $U_1$, $U_2$, $U_3$ and $U_4$ obtained after analog-to-digital conversion of the output voltage signals of the four linear Hall sensors is:

$$\begin{cases} U_A = U_1 + U_3 \\ U_B = U_2 + U_4 \end{cases},$$

-continued $$\begin{bmatrix} U_\alpha \\ U_\beta \end{bmatrix} = \begin{bmatrix} 1 & 0 \\ \dfrac{\cos\varphi_s}{\sin\varphi_s} & -\dfrac{1}{\sin\varphi_s} \end{bmatrix} \begin{bmatrix} U_A \\ U_B \end{bmatrix} = U_m \left( \begin{bmatrix} \cos\theta \\ \sin\theta \end{bmatrix} + \begin{bmatrix} \varepsilon(3\theta) \\ \varepsilon(3\theta) \end{bmatrix} \right).$$

wherein, $U_A$ and $U_B$ are a pair of sinusoidal signals (including the third harmonic) with an amplitude of $U_m$ and a phase difference of $\varphi_s$, $U_\alpha$ and $U_\beta$ are a pair of quadrature signals (including the third harmonic); and the signal $U_\beta$ lags behind the signal $U_\alpha$ by an electrical angle of 90°.

Step 2: calculating the rotor angle value and the rotational speed value according to the digital signals in the two-phase stationary coordinate system.

Figure 3:
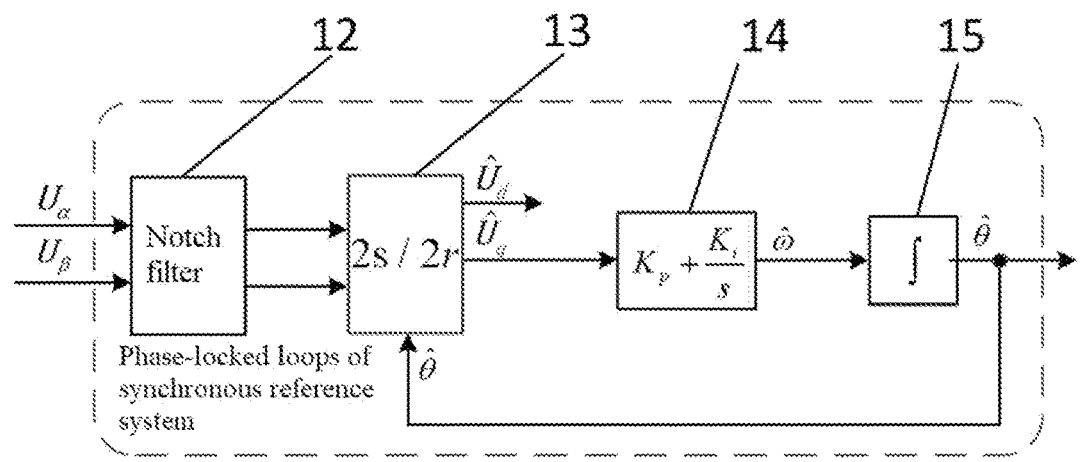
FIG. 3 is a block diagram of phase-locked loops of synchronous reference system with the third harmonic suppression capability involved in an embodiment of the present invention.

Specifically, as shown in FIG. 3, the phase-locked loops of synchronous reference system with the third harmonic suppression capability include: a notch filter 12, a phase detector 13, a loop filter 14 and a voltage-controlled oscillator 15.

The notch filter is configured to filter out the specified third harmonic, leaving only the fundamental components $U_{\alpha 1}$ and $U_{\beta 1}$ of the quadrature signals in the two-phase stationary coordinate system.

An input end of the phase detector is connected to $U_{\alpha 1}$ and $U_{\beta 1}$, in the two-phase stationary coordinate system, the input end of the phase detector is further connected to an output end of the voltage-controlled oscillator, an input end of the loop filter is connected to an output terminal of the phase detector, and an input end of the voltage-controlled oscillator is connected to an output end of the loop filter. That is, the phase detector, loop filter and voltage-controlled oscillator form a closed loop.

The phase detector is configured to convert the digital signals $U_{\alpha 1}$ and $U_{\beta 1}$, in the two-phase stationary coordinate system and the rotor angle value $\hat{\theta}$ output by the voltage-controlled oscillator, and the digital signals $U_{\alpha 1}$ and $U_{\beta 1}$ in the two-phase stationary coordinate system are converted into $U_d$ and $U_q$ in a two-phase rotating coordinate system. Specifically, the phase detector is expressed in a matrix form as:

$$\begin{bmatrix} \hat{U}_d \\ \hat{U}_q \end{bmatrix} = S \begin{bmatrix} U_{\alpha 1} \\ U_{\beta 1} \end{bmatrix} = \begin{bmatrix} \cos\hat{\theta} & \sin\hat{\theta} \\ -\sin\hat{\theta} & \cos\hat{\theta} \end{bmatrix} \begin{bmatrix} U_{\alpha 1} \\ U_{\beta 1} \end{bmatrix} = U_m \begin{bmatrix} \cos(\theta - \hat{\theta}) \\ \sin(\theta - \hat{\theta}) \end{bmatrix},$$

wherein, $\hat{U}_d$ is a d-axis direction component in the two-phase rotating coordinate system, and the d-axis direction is consistent with a direct-axis direction of the rotor; $\hat{U}_q$ is a q-axis direction component in the two-phase rotating coordinate system, and is an output signal of the phase detector, and the q-axis direction is consistent with a quadrature axis direction of the rotor and is 90° ahead of the d-axis direction; S is the 2s/2r transformation; and $\hat{\theta}$ is an output signal of the voltage-controlled oscillator and is an estimate of the electrical angle of the rotor.

The following embodiment is provided based on the content in the claims.

Embodiment 1

As shown in FIG. 4, a method and a system for measuring a flux-switching electric motor rotor angle on the basis of linear Hall sensors provided in the embodiment is a three-phase 12-slot and 10-pole stator permanent magnet flux-switching motor 1. As shown in FIG. 4, the 12-slot and 10-pole stator permanent magnet flux-switching motor 1 includes a rotor 7, stators 8, a rotating shaft 9, and permanent magnets 10. The rotor 7 is assembled on the rotating shaft 9 by means of an interference method or a keyway method, the stators 8 are evenly arranged in a circumferential direction, the permanent magnets 10 are embedded between the two adjacent stators 8, magnetization directions of the two adjacent permanent magnets 10 are opposite, and the stator 8 and the permanent magnets 10 are spaced apart to form an annular stator structure assembled on the radial outer side of the rotor 7.

When rotating at a constant speed, the permanent magnets are magnetized in such a way that the waveform of the no-load air gap flux density of at the slots of the stator is in sinusoidal distribution. The stator includes 12 slots 11, and the slot width is at least 4.5 mm capable of accommodating the linear Hall sensors of the SIP-3 package. As shown in FIG. 4, among the four linear Hall sensors, a first linear Hall sensor 3 is mounted in any slot of the stator 8, a second linear Hall sensor 4 is spaced apart from the first linear Hall sensor 3 by 2 slots in a unified direction, meeting the requirements that $N_1$ is an even number, and $N_1 \neq ks/(2p)$, wherein k being any integer, s being the number of slots of the stator 12, p being the number of pairs of electric motor poles 10; a third linear Hall sensor 5 is spaced apart from the first linear Hall sensor 3 by 3 slots, meeting the requirements that $N_2$ is an odd number, and $N_2=(2k-1)s/(2p)$; and a fourth linear Hall sensor 6 is spaced apart from the second linear Hall sensor 4 by 3 slots. Magnetically sensitive surfaces of the four linear Hall sensors are all opposite the surface of a rotor salient pole o Taking the counterclockwise direction as a forward direction, when the rotor rotates in the forward direction at a constant speed, an electrical angle phase difference of output voltage signals between the first linear Hall sensor 3 and the second linear Hall sensor 4 is $\varphi_s=60°$, output voltage signals between the first linear Hall sensor 3 and the third linear Hall sensor 5 are in phase, and output voltage signals between the second linear Hall sensor 4 and the fourth linear Hall sensor 6 are in phase.

The output voltage signals of the four linear Hall sensors are separately connected to the digital signal processor 2, and the power supply voltage of the digital signal processor 2 is 3.3 V. In the digital signal processor, the output voltage signals of the four linear Hall sensors are converted into three-phase original digital signals, expressed as:

$$\begin{cases} U_1 = U_m \cos\theta + U_{DC} + \delta_1 \\ U_2 = U_m \cos(\theta - \pi/3) + U_{DC} + \delta_2 \\ U_3 = U_m \cos\theta - U_{DC} + \delta_3 \\ U_4 = U_m \cos(\theta - \pi/3) - U_{DC} + \delta_4 \end{cases},$$

wherein, $U_1$ is a digital signal after analog-to-digital conversion of the output voltage signals of the first linear Hall sensor, $U_2$ is a digital signal after analog-to-digital conversion of the output voltage signals of the second linear Hall sensor, $U_3$ is a digital signal after analog-to-digital conversion of the output voltage signals of the third linear Hall sensor, and $U_4$ is a digital signal after analog-to-digital conversion of the output voltage signals of the fourth linear Hall sensor; $\delta_1$ is a disturbance term in the output voltage signals of the first linear Hall sensor, $\delta_2$ is a disturbance term in the output voltage signals of the second linear Hall sensor, $\delta_3$ is a disturbance term in the output voltage signals of the third linear Hall sensor, and $\delta_4$ is a disturbance term in the output voltage signals of the fourth linear Hall sensor; $U_m$ is amplitudes of the output voltage signals of the four linear Hall sensors, and the amplitudes are equal because the distance of the four linear Hall sensors is located on the same circumference; and θ is an actual electrical angle of the rotor.

The digital signal processor 2 performs in-phase signal superposition processing on the output voltage signals of the four linear Hall sensors, and the digital signal values of the two-phase sinusoidal signals are thus obtained:

$$\begin{cases} U_A = U_1 + U_3 = \cos\theta + \varepsilon(3\theta) \\ U_B = U_2 + U_4 = \cos(\theta + \pi/3) + \varepsilon(3\theta) \end{cases}.$$

The digital signal processor 2 performs a linear combination of the digital signal values of the two-phase sinusoidal signals, and the digital signal values in the two-phase stationary coordinate system are thus obtained:

$$\begin{bmatrix} U_\alpha \\ U_\beta \end{bmatrix} = \begin{bmatrix} 1 & 0 \\ \frac{\cos\pi/3}{\sin\pi/3} & -\frac{1}{\sin\pi/3} \end{bmatrix} \begin{bmatrix} U_A \\ U_B \end{bmatrix} = \begin{bmatrix} \cos\theta \\ \sin\theta \end{bmatrix} + \begin{bmatrix} \varepsilon(3\theta) \\ \varepsilon(3\theta) \end{bmatrix},$$

wherein, $U_A$ and $U_B$ are a pair of sinusoidal signals with an amplitude of 1V and a phase difference of 60°, $U_\alpha$ and $U_\beta$ are a pair of quadrature signals; and the signal $U_\beta$ lags behind the signal $U_\alpha$ by an electrical angle of 90°.

As shown in FIG. 3, in the embodiment, phase-locked loops of synchronous reference system are employed to extract the rotor angle value and the rotational speed value from the digital signals in the two-phase stationary coordinate system; the phase-locked loops of synchronous reference system includes: a notch filter 12, a phase detector 13, a loop filter 14 and a voltage-controlled oscillator 15; a second-order complex factor filter is adopted as the notch filter 12 for filtering out the specified third harmonic, leaving only the fundamental component; the phase detector 13 is a 2s/2r transformation module, and an input signal thereof is the fundamental component and output signals of the voltage-controlled oscillator 15; 2s/2r transformation involves a process of converting digital signals in the two-phase stationary coordinate system into digital signals in the two-phase rotating coordinate system; output of the phase detector 13 is taken as input of the loop filter 14; output 6), of the loop filter 14 is taken as input of the voltage-controlled oscillator 15, and an estimate of the rotor speed; and the phase detector 13, loop filter 14 and voltage-controlled oscillator 15 form a closed loop.

The phase detector 13 is expressed in a matrix form as:

$$\begin{bmatrix} \hat{U}_d \\ \hat{U}_q \end{bmatrix} = S\begin{bmatrix} U_{\alpha 1} \\ U_{\beta 1} \end{bmatrix} = \begin{bmatrix} \cos\hat{\theta} & \sin\hat{\theta} \\ -\sin\hat{\theta} & \cos\hat{\theta} \end{bmatrix}\begin{bmatrix} U_{\alpha 1} \\ U_{\beta 1} \end{bmatrix} = \begin{bmatrix} \cos(\theta - \hat{\theta}) \\ \sin(\theta - \hat{\theta}) \end{bmatrix},$$

wherein, $\hat{U}_d$ is a d-axis direction component in the two-phase rotating coordinate system, and the d-axis direction is consistent with a direct-axis direction of the rotor; $\hat{U}_q$ is a q-axis direction component in the two-phase rotating coordinate system, and is an output signal of the phase detector, and the q-axis direction is consistent with a quadrature axis direction of the rotor and is 90° ahead of the d-axis direction; S is the 2s/2r transformation; and $\hat{\theta}$ is an output signal of the voltage-controlled oscillator and is an estimate of the electrical angle of the rotor.

In combination with FIG. 3 and the above formula, it can be concluded that:

1) $\hat{U}_q$ is adjusted to be 0 by a negative feedback system, that is, $\theta-\hat{\theta}$ converged to be 0, which means that an estimated angle value follows an actual angle value;
2) when $\theta-\hat{\theta}$ is close to 0, $\sin(\theta-\hat{\theta})$ is linear, that is, $\sin(\theta-\hat{\theta})\approx\theta-\hat{\theta}$;
3) when $\theta-\hat{\theta}$ is close to 0, $\cos(\theta-\hat{\theta})$ is close to 1, thereby $\hat{U}_d\approx U_m$, that is, $\hat{U}_d$ indicates an amplitude of signals of the three-phase Hall sensors;

The loop filter 14 adopts a conventional PI controller with a proportional coefficient $K_p=100$ and an integral coefficient $K_i=5000$, so as to meet fast performance of the system.

The voltage-controlled oscillator 15 adopts an integrating module.

Figure 5:
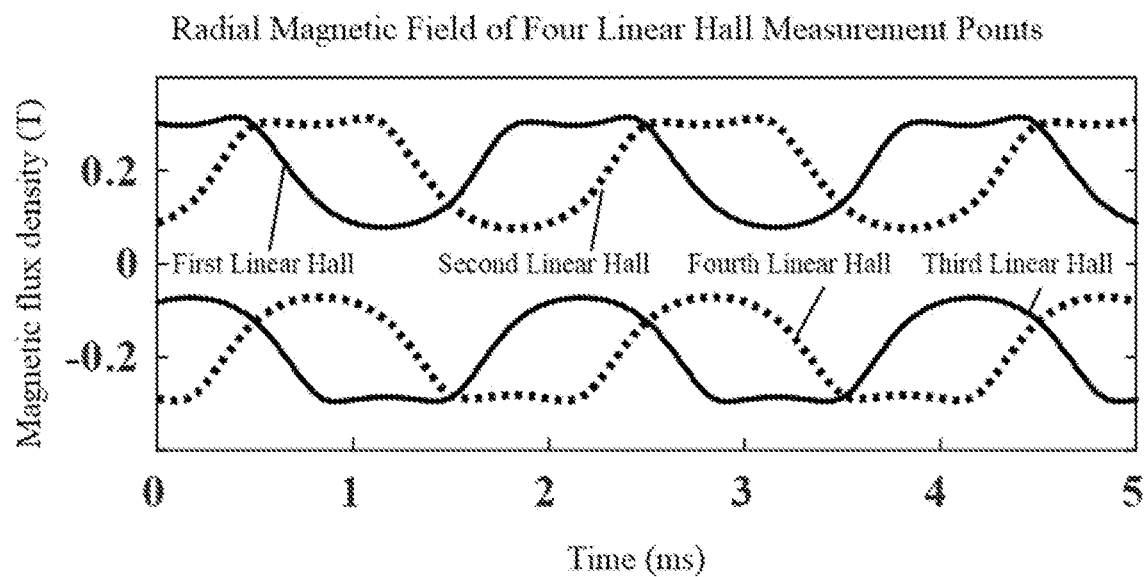
FIG. 5 a radial magnetic field distribution diagram of four linear Hall measurement points in an embodiment of the present invention.
Figure 6:
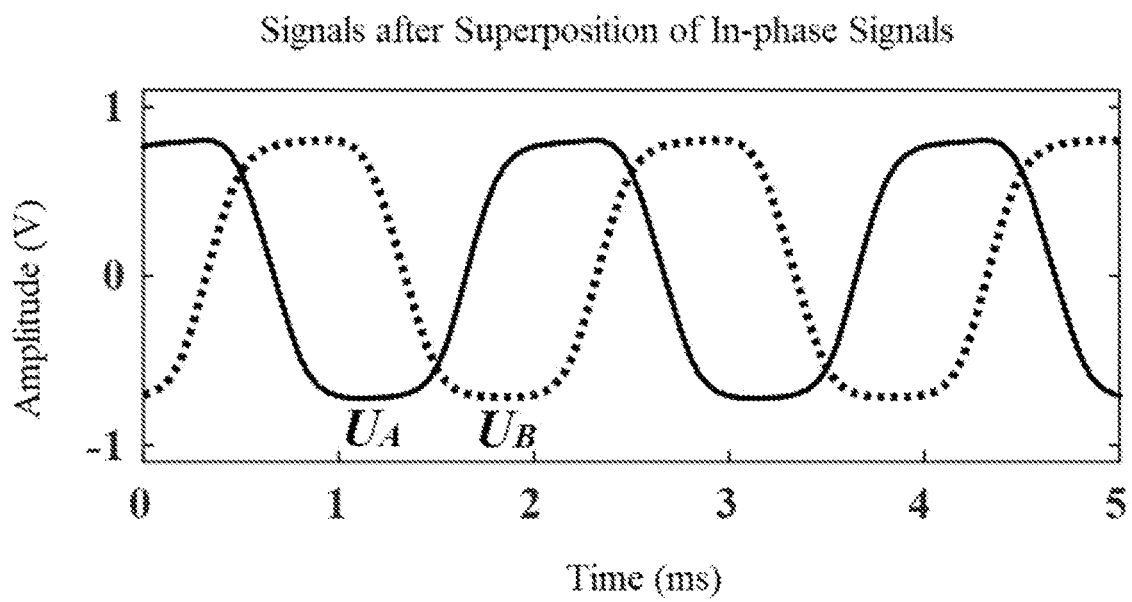
FIG. 6 is a signal waveform diagram after superposition of in-phase signals in an embodiment of the present invention.
Figure 7:
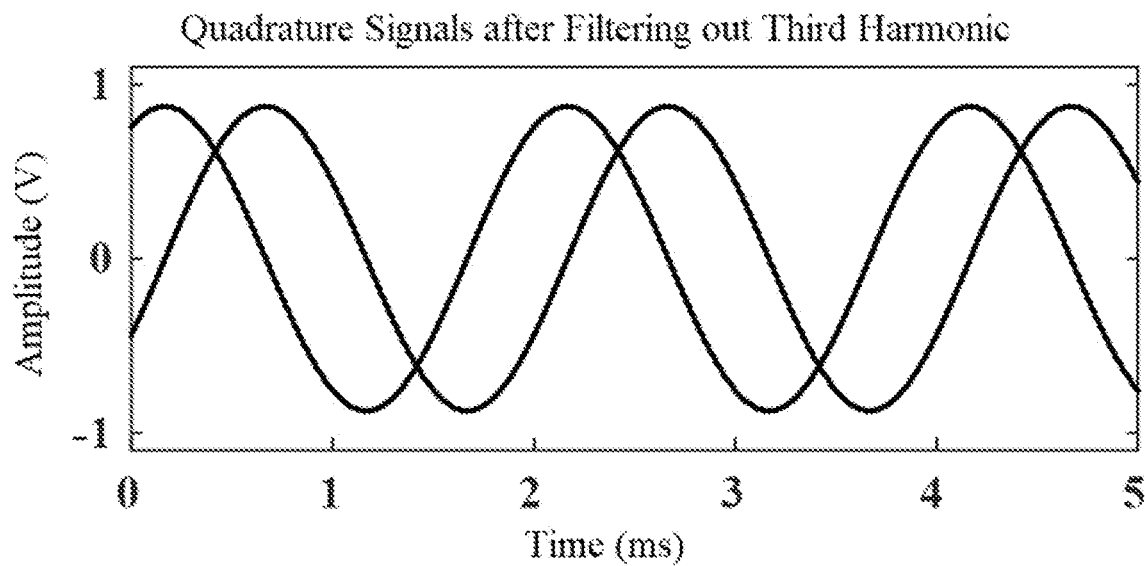
FIG. 7 is a waveform diagram of quadrature signals after filtering out the third harmonic in an embodiment of the present invention.
Figure 8:
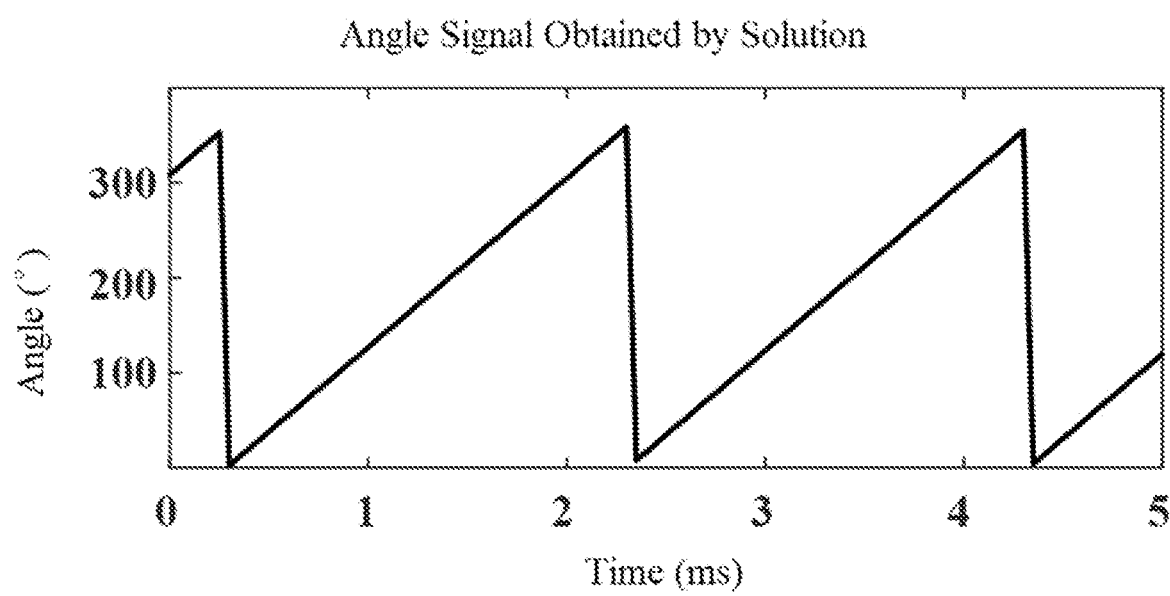
FIG. 8 is a waveform diagram of an angle signal obtained by solution in an embodiment of the present invention.

FIG. 5 illustrates a radial magnetic field of the four linear Hall measurement points when a rotational speed is set to be 3000 r/min, FIG. 6 is a waveform diagram of a pair of quadrature signals obtained by superimposing the in-phase signals, FIG. 7 is a waveform diagram of the quadrature signals after filtering out the third harmonic; and FIG. 8 is an estimate of a rotor angle obtained from the solution. It can be seen that the present invention realizes high-precision angle measurement, and meets the requirements of angle measurement and speed measurement of high-performance magnetic flux switching motors.

The foregoing descriptions are merely preferred specific implementations of the present invention, and are not intended to limit the protection scope of the present invention. Any equivalent replacements or changes made by a person skilled in the art according to the technical solutions of the present invention and the inventive concepts thereof within the technical scope disclosed in the present invention shall fall within the protection scope of the present invention.

What is claimed is:

1. A method for measuring a flux-switching electric motor rotor angle on basis of linear Hall, a first linear Hall element, a second linear Hall element, a third linear Hall element and a fourth linear Hall element are mounted in sequence in slots of four stators of a flux-switching electric motor upon a principle that output signals between the first linear Hall element and the third linear Hall element are in phase and output signals between the second linear Hall element and the fourth linear Hall element are in phase, two sets of in-phase output signals are superimposed separately to obtain a pair of sinusoidal signals, a linear combination of the pair of sinusoidal signals is performed to obtain a pair of quadrature signals in a two-phase stationary coordinate system, and a closed-loop control is performed on the pair of quadrature signals in the two-phase stationary coordinate system according to an estimate of a rotor angle, wherein an expression for the pair of sinusoidal signals obtained by superimposing the two sets of in-phase output signals is $$\begin{cases} U_A = U_1 + U_3 = U_m\cos\theta + \varepsilon(3\theta) \\ U_B = U_2 + U_4 = U_m\cos(\theta + \varphi_s) + \varepsilon(3\theta) \end{cases},$$

in which $U_A$ and $U_B$ are a pair of sinusoidal signals with an amplitude of $U_m$ and a phase difference of $\varphi_s$, $U_1$, $U_2$, $U_3$ and $U_4$ are output signals of the first, second, third and fourth linear Hall elements, θ is an actual electrical angle of a rotor, and $\varepsilon(3\theta)$ is third harmonic.

2. The method for measuring the flux-switching electric motor rotor angle on basis of linear Hall according to claim 1, wherein the first linear Hall element is mounted in any slot of the stator of the flux-switching electric motor, a mounting slot of the second linear Hall element is away from a mounting slot of the first linear Hall element by $N_1$ slots, a mounting slot of the third linear Hall element is away from the mounting slot of the first linear Hall element by $N_2$ slots, a mounting slot of the fourth linear Hall element is away from the mounting slot of the first linear Hall element by $N_3$ slots, wherein $N_1$ is an even number, and $N_1 \neq ks/(2p)$, $N_2$ is an odd number, and $N_2=(2k-1)s/(2p)$, k being any integer, s being the number of slots of the stator, and p being the number of pairs of electric motor poles.

3. The method for measuring the flux-switching electric motor rotor angle on basis of linear Hall according to claim 1, wherein an expression for the pair of quadrature signals in the two-phase stationary coordinate system obtained by linear combination of the pair of sinusoidal signals is $$\begin{bmatrix} U_\alpha \\ U_\beta \end{bmatrix} = \begin{bmatrix} 1 & 0 \\ \frac{\cos\varphi_s}{\sin\varphi_s} & -\frac{1}{\sin\varphi_s} \end{bmatrix} \begin{bmatrix} U_A \\ U_B \end{bmatrix} = U_m \begin{bmatrix} \cos\theta \\ \sin\theta \end{bmatrix} + \begin{bmatrix} \varepsilon(3\theta) \\ \varepsilon(3\theta) \end{bmatrix},$$

in which $U_\alpha$ and $U_\beta$ are a pair of quadrature signals in the two-phase stationary coordinate system.

4. A system for implementing the method for measuring the flux-switching electric motor rotor angle on basis of linear Hall according to claim 1, comprising:
the first, second, third and fourth linear Hall elements mounted in sequence in slots of the stator of the flux-switching electric motor, wherein the output signals between the first linear Hall element and the third linear Hall element are in phase, and the output signals between the second linear Hall element and the fourth linear Hall element are in phase; and
a digital signal processor, two sets of in-phase output signals are superimposed separately to obtain a pair of sinusoidal signals, a linear combination of the pair of sinusoidal signals is performed to obtain a pair of quadrature signals in a two-phase stationary coordinate system, and a closed-loop control is performed on the pair of quadrature signals in the two-phase stationary coordinate system according to an estimate of a rotor angle.

5. The system for implementing the method for measuring the flux-switching electric motor rotor angle on basis of linear Hall according to claim 4, wherein the digital signal processor comprises:
an analog-to-digital conversion module, which is configured to receive signals output by the first, second, third and fourth linear Hall elements, and to output digital values of the output signals of the first to fourth linear Hall elements;
an in-phase superposition module, which superimposes the digital values of the output signals of two sets of linear Hall elements with the same phase to obtain a pair of sinusoidal signals;
a linear combination module, which performs a linear combination of the pair of sinusoidal signals to obtain a pair of quadrature signals in a two-phase stationary coordinate system; and
phase-locked loops of synchronous reference system, which performs a closed-loop control on the pair of quadrature signals in the two-phase stationary coordinate system according to an estimate of the rotor angle.

6. The system for implementing the method for measuring the flux-switching electric motor rotor angle on basis of linear Hall according to claim 5, wherein the phase-locked loops of synchronous reference system comprise:
a notch filter, wherein an input end of the notch filter is coupled to the quadrature signals in the two-phase stationary coordinate system and to output fundamental components of the quadrature signals in the two-phase stationary coordinate system;
a phase detector, wherein an input end of the phase detector is coupled to the fundamental components of the quadrature signals in the two-phase stationary coordinate system and to coordinate transformation on the fundamental components of the quadrature signals in the two-phase stationary coordinate system, and output quadrature signals in a two-phase rotating coordinate system;
a loop filter, wherein an input end of the loop filter is coupled to a q-axis component of the quadrature signals in the two-phase rotating coordinate system and to an estimate of a rotor speed; and
a voltage-controlled oscillator, wherein an input end of the voltage-controlled oscillator is coupled to the estimate of the rotor speed and to output an estimate of the rotor angle.

\* \* \* \* \*